Figure 1:
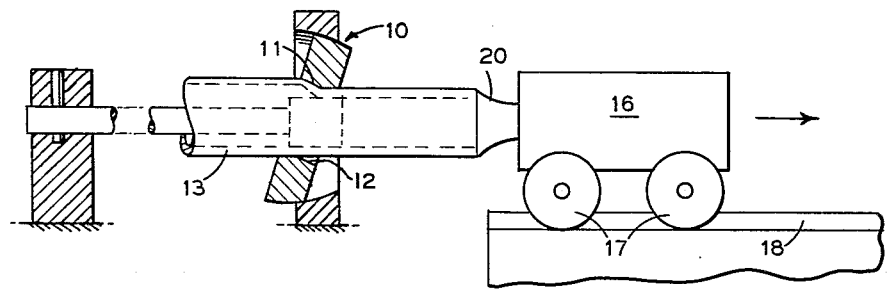

May 5, 1964   J. R. HILL ETAL   3,131,803
METHOD OF AND APPARATUS FOR COLD DRAWING METAL TUBES
Filed Dec. 4, 1961

INVENTORS
John R. Hill
BY  Joseph A. Sawester

ATTORNEY

United States Patent Office 3,131,803
Patented May 5, 1964

3,131,803
METHOD OF AND APPARATUS FOR COLD
DRAWING METAL TUBES
John R. Hill and Joseph A. Sawester, Beaver Falls, Pa.,
assignors to The Babcock & Wilcox Company, New
York, N.Y., a corporation of New Jersey
Filed Dec. 4, 1961, Ser. No. 156,802
6 Claims. (Cl. 205—7)

The present invention relates to the manufacture of tubing, and more particularly to a novel method of and apparatus for correcting eccentricity of the outer and inner surfaces or diameters of metal tubing so as to produce tubing of substantially uniform wall thickness.

In the manufacture of metal tubing, particularly seamless tubing, manufactured by the rotary piercing or extrusion processes, for example, there is usually a lack of concentricity between the inner and outer circular peripheries of the tubing resulting in a variation in the wall thickness of the tubing circumferentially thereof. The zones of maximum and minimum wall thickness are substantially diametrically opposite each other. In the case of extruded tubing, the zone of maximum wall thickness generally extends substantially longitudinally of the tubing whereas, in the case of rotary pierced tubing, such zone may follow a spiral path along the tubing.

For many applications of tubing, such a variation in wall thickness is not primarily an important factor. However, certain applications require tubing having not less than a specified or pre-set minimum wall thickness. When the inner and outer peripheries are not concentric, resulting in wall thickness varying from a maximum to a minimum, the actual minimum wall thickness must equal the required minimum thickness. In turn, the maximum wall thickness will then be in excess of the required minimum wall thickness. Consequently, the weight of metal in the tube will be in excess of that required were the wall thickness substantially uniform circumferentially of the tube.

Stated succinctly, to obtain a pre-set minimum wall thickness in a tube whose wall thickness varies circumferentially requires a greater amount of metal than is needed to obtain the same pre-set minimum wall thickness in a tube whose wall thickness is uniform circumferentially. As a result, the material cost of such a tube having a variable wall thickness exceeds that of a tube having a uniform wall thickness. This is an excess metal cost which can run into a large sum in mass production of tubing. Consequently, there is a substantial saving in metal cost available in producing tubes with a pre-set minimum wall thickness if the tubes can be produced with a uniform wall thickness, as less weight of metal would be required for each such tube.

Drawing a tube through a fixed die without a mandrel will reduce the outer diameter of the tube without any appreciable change in the wall thickness, so that the metal flow will be substantially all longitudinal during the drawing operation and any eccentricity present in the tube will remain substantially unchanged. Using a fixed position mandrel in combination with the fixed die may change both the internal and external diameters, and the wall thickness, depending on the effective die and mandrel dimensions, but will not appreciably change tube eccentricity.

In accordance with the present invention, it has been found that eccentricity between the inner and outer circumferential peripheries of a tube can be corrected by cold drawing the tube through a tilted tube drawing die, or rolls, ot correct the tube eccentricity and over a mandrel to produce a finished tube of the desired internal and external dimensions.

The use of a tilted die to correct tube eccentricity is disclosed and claimed in a copending application of Chalmers L. Helble and Frank L. Boyer, S.N. 771,642, filed November 3, 1958, now Patent No. 3,095,083. As disclosed in said application the tube drawing die is tilted to correct the tube eccentricity, and as the angular location of the maximum wall thickness varies longitudinally of the tube, the tilted die is correspondingly rotated. Any change in the amount of tube eccentricity occurring longitudinally of the tube may also be compensated for by changing the angularity of die tilting. As disclosed in said application, the angular adjustment of the tilted die, either with respect to a vertical reference plane or with respect to the circumference of the tube may be accomplished by manual or automation regulation of the die position.

It has previously been believed a drawing operation to correct the eccentricity of a tube must be followed by the usual die and mandrel operation as an entirely separate step. This conclusion was based on the knowledge that the tilted die procedure caused an increase in the thickness of the tube wall by predominantly circumferential metal flow in the tube and the longitudinal flow of the tube metal caused by using a mandrel to reduce the maximum wall thickness of the tube would interfere with the tilted die corrective action.

We have found, however, that using a tilted die with a mandrel as hereinafter described, will permit correction of tube eccentricity as well as finish the tube to a desired wall thickness in one cold drawing pass.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 3:
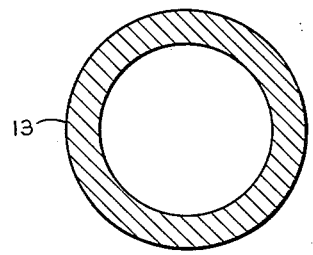
Figure 2:
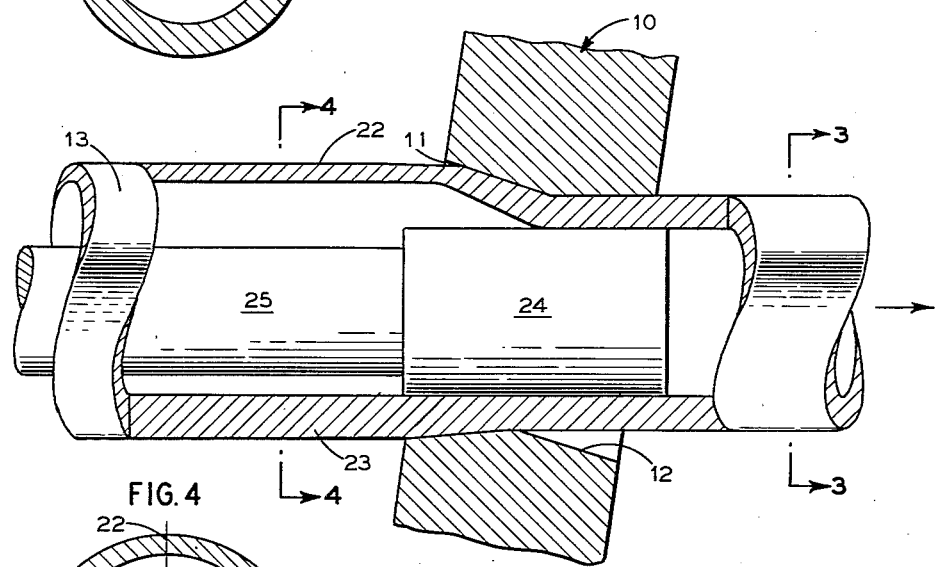
Figure 4:
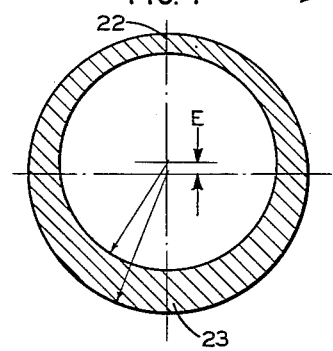

Of the drawings:

FIG. 1 is a somewhat diagrammatic representation, partly in section, of a tube drawing apparatus including the structure of the present invention;

FIG. 2 is an enlarged longitudinal section of a tilted reducing die and a mandrel used in the cold drawing of a tube in accordance with the invention; and FIGS. 3 and 4 are sections taken along the lines 3—3 and 4—4, respectively, of FIG. 2.

In the cold drawing of metallic tubes the drawbench may include an annular reducing die, a mandrel and a mechanism for drawing the tube through the die and over the mandrel. The die may be of the fixed or tilting adjustable type, or may be formed of roller members, while the mandrel may be of the fixed type.

In the embodiment of the invention shown in the drawings an annular die 10 is mounted for tilting movement in a supported die holder (not shown). The die is formed with a converging frusto-conical entrance portion 11 merging into a diverging frusto-conical discharge portion 12 defining a tube reducing throat. The die 10 is tilted from the vertical at an angle coordinated with the amount of eccentricity in the tube 13 being drawn therethrough.

As shown in FIG. 1, the mechanism for drawing the tube through the die 10 includes a carriage 16 mounted on wheels 17 engaging rails 18 for movement of the carriage toward and away from the die 10. The carriage 16 is provided with jaws (not shown) actuated by pneumatic power pistons, for example, to grip the reduced end portion 20 of the tube 13 to be drawn through the die 10. In the usual installation a mechanism is provided for moving the carriage 16 along the rails 18 at a controlled rate of movement so that the speed of tube movement through the die 10 can be regulated as required by the nature of the tube reduction. Such mechanism may take the form of an endless chain (not shown) between the rails 18.

As disclosed in the said copending application S.N. 771,642, owned by the assignee of this application, eccentricity in a tube may be corrected by tilting the die 10 so as to displace metal in a circumferential direction to increase the thickness of the thinner portion of the eccentric tube. In such a "sinking" or drawing procedure the maximum thickness of the tube is not appreciably changed while the minimum thickness of the tube wall is increased, with the amount of tube wall increase largely dependent upon the tilt angle of the die 10.

As shown in FIG. 2, the tube 13 entering the die 10 is eccentric, that is to say the wall 22 at the top of illustration has a lesser thickness than the wall 23 at the bottom. This is illustrated in exaggerated form in FIG. 3 where is will be noted the eccentricity of the tube may be indicated by the letter E which is the difference between the centers of the circles corresponding with the interior and exterior surfaces of the tube. After passing through the tilted die and mandrel combination of this invention, the eccentricity of the tube is substantially reduced as shown in FIG. 4, where the centers of curvature of both the inner and outer surfaces of the tube tend to coincide. Under such corrected conditions, the value of eccentricity E has been reduced to approach a zero value.

Referring particularly to FIG. 2, it will be noted the die 10 is tilted about a transverse horizontal axis at an angle of from 1 to 15 degrees, or more, from a vertical plane normal to the longitudinal axis of the tube 13 depending on the amount of eccentricity present in the entering tube. Such a tilted position is used to correct tube eccentricity when the minimum wall thickness lies at the top of the tube. As the zone of minimum tube wall thickness changes its location angularly of the tube, the direction of the tilt of the die 10 will be manually or automatically rotated a corresponding amount.

The die 10 reduces the outer diameter of the tube 13, and by tilting the die, as shown, the reducing action of the die can be selectively applied to a selected arc of the tube, while the remaining portion of the periphery or arc of the tube may be reduced or not at all. Tilting the die in the manner disclosed imposes a greater radial unit pressure on the arc of the wall 22 so that the metal is crowded circumferentially of the tube 13 due to the reducing action of the die. This crowding action of the metal thickens the thin wall portion of the tube in an arc of the tube wall. Such thickening will be a maximum where the angle between the inlet surface of the die and the surface of the entering tube is at a maximum.

The mandrel 24 is supported on a bar 25 which in turn is supported at one end so as to maintain the longitudinal location of the mandrel 24 at a selected position with respect to the die 10. While the bar 25 has such a great length to diameter ratio as to be flexible, the mandrel 24 will be maintained in a substantially central postion in the die by reason of the forces applied by the tube metal thereon.

The tilted die 10 is used to establish a substantially uniform wall thickness circumferentially of the tube by increasing the minimum entering tube wall thickness. The mandrel 24 may have an exterior diameter substantially equal to the internal diameter of the tube passed through the tilted die or the mandrel may have an exterior diameter selected to perform some work on the interior surface of the tube. In either situation, contact between the mandrel surface and the interior surface of the tube 13 will occur after the characteristic eccentricity correction of the tilted die 10 has been substantially accomplished. The use of the mandrel is particularly effective in finishing the interior diameter of the tube, whether the amount of work accomplished on the inner surface of the tube is a large or small amount.

The primary advantage of utilizing a mandrel with the tilted die lies in the ability of the combination to attain both tube eccentricity correction and the desired tube wall thickness in a single pass through the drawbench. This is of considerable economic advantage as compared with the separate "sinking" pass for tube eccentricity correction followed by a pass with a mandrel to finish the tube by reducing the tube wall thickness, as heretofore used in the tube production field.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A method of processing a metal tube having a wall thickness varying circumferentially from a maximum to a minimum, comprising the steps of drawing the tube through a reducing zone to decrease the external tube diameter, while so drawing the tube, exerting on the tube wall within a selected arc, substantially centered relative to the zone of minimum wall thickness, a radial unit pressure greater than that exerted on the remaining portion of the tube circumference, to crowd metal of the tube wall, within such selected arc, circumferentially of the tube to increase the tube wall thickness within said selected arc to substantially such maximum tube wall thickness, and thereafter reducing the thickness of said tube wall while still in said reducing zone substantially uniformly around the circumference of the tube by the radially outward application of forces causing a longitudinal flow of metal in said tube.

2. A method of processing a metal tube having a wall thickness varying circumferentially from a maximum to a minimum, comprising the steps of drawing the tube through a reducing die to reduce the external tube diameter, while so drawing the tube, maintaining the die oriented with its axis at an angle to the axis of the tube entering the die to exert on the tube wall within a selected arc, substantially centered relative to the zone of minimum wall thickness, a radial unit pressure greater than that exerted on the remaining portion of the tube circumference by virtue of the angular relation of the die and entering tube axes, to crowd metal of the tube wall, within such selected arc, circumferentially of the tube to increase the tube wall thickness within said selected arc; maintaining the angle between the die and entering tube axis at a value to increase the wall thickness within such selected arc to substantially such maximum tube wall thickness, and thereafter reducing the thickness of said tube wall while still in said die substantially uniformly around the circumference of the tube by the radially outward application of forces causing a longitudinal flow of metal in said tube.

3. Apparatus for processing eccentric metal tubes comprising, in combination, a draw bench, means for mounting an annular die on said bench, means for passing a tube through said die, means for selectively tilting said die from a vertical plane normal to the axis of said tube, a mandrel having a selected external diameter, and means including a bar for positioning said mandrel within said tube at a fixed position within said die.

4. Apparatus for processing metal tubes comprising in combination, an annular reducing die having a tapered entrance portion, means for drawing a tube through said die, means for selectively tilting said die from a plane normal to the axis of the tube being drawn through the die, said die being tilted to crowd metal circumferentially of said tube and to thereby increase the thickness of a selected arc of the tube, a mandrel having an exterior diameter selected for the desired internal diameter of the drawn tube, and means for positioning said mandrel within said tube at a fixed location with said die and after the tilted die has caused metal to be crowded circumferentially of said tube.

5. Apparatus for processing a metal tube having a wall thickness varying circumferentially from a maximum to a minimum, said apparatus comprising, in combination, a draw bench including an annular die having a flared entry throat mounted on said draw bench, said die being mounted with the angle between the axis of said die and the axis of a tube drawn therethrough to exert on the tube wall within a selected arc substantially centered relative to the zone of minimum wall thickness a radial unit pressure greater than that exerted on the remaining portion of the tube circumference by virtue of the angular relation of the die and entering tube axes to increase the tube wall thickness within said selected arc and of the position of such selected arc circumferentially of the tube wall to maintain the selected arc centered on the zone of minimum wall thickness, a mandrel, and means for supporting said mandrel within said tube and die and effective to maintain a selected inner diameter of said drawn tube.

6. Apparatus for processing a metal tube having a wall thickness varying circumferentially from a maximum to a minimum, said apparatus comprising, in combination, a draw bench including an annular die having a flared entry throat mounted on said draw bench, said die being mounted with the angle between the axis of said die and the axis of a tube drawn therethrough to exert on the tube wall within a selected arc substantially centered relative to the zone of minimum wall thickness a radial unit pressure greater than that exerted on the remaining portion of the tube circumference by virtue of the angular relation of the die and entering tube axes to increase the tube wall thickness within said selected arc and of the position of such selected arc circumferentially of the tube wall to maintain the selected arc centered on the zone of minimum wall thickness, a mandrel, and cantilever support means for positioning said mandrel within said tube and die effective to increase the inner diameter of said drawn tube after the wall of the tube becomes concentric by passing through a portion of said die.

References Cited in the file of this patent

UNITED STATES PATENTS

| 259,898 | Billings | Apr. 1, 1884 |
| 2,351,710 | Sanders | June 20, 1944 |
| 2,663,410 | Kessler | Dec. 22, 1953 |
| 2,928,526 | Kerr | Mar. 15, 1960 |
| 3,006,460 | Poncar | Oct. 31, 1961 |
| 3,013,652 | Russel | Dec. 19, 1961 |

FOREIGN PATENTS

| 13,506 | Great Britain | Oct. 5, 1887 |